(12) United States Patent
Caradec et al.

(10) Patent No.: US 9,840,266 B2
(45) Date of Patent: Dec. 12, 2017

(54) APPARATUS AND METHOD FOR TOWING A LOAD BY A PERSON

(71) Applicant: Glidemachines LLC, Denver, CO (US)

(72) Inventors: Andre Francois Thomas Caradec, Oakland, CA (US); Mauricio Mejia, Denver, CO (US); William H. Warne, Bend, OR (US)

(73) Assignee: Glidemachines LLC, Denver, CO (US)

( * ) Notice: Subject to any disclaimer, the term of this patent is extended or adjusted under 35 U.S.C. 154(b) by 0 days.

(21) Appl. No.: 14/510,876

(22) Filed: Oct. 9, 2014

(65) Prior Publication Data

US 2016/0101800 A1   Apr. 14, 2016

Related U.S. Application Data

(60) Provisional application No. 61/888,860, filed on Oct. 9, 2013.

(51) Int. Cl.
*B62B 7/02* (2006.01)
*B62B 5/06* (2006.01)

(52) U.S. Cl.
CPC ............... *B62B 5/068* (2013.01); *B62B 7/02* (2013.01)

(58) Field of Classification Search
CPC .. B62B 5/068; B62B 7/00; B62B 7/02; B62C 5/02; A63B 2055/604; A01M 31/006
USPC ........ 224/184; 280/1.5, 47.131, 47.32, 47.33
See application file for complete search history.

(56) References Cited

U.S. PATENT DOCUMENTS

| | | |
|---|---|---|
| 660,598 A | 10/1900 | Stonebridge |
| 2,343,019 A | 2/1944 | Neal |
| 3,271,048 A | 9/1966 | Beesley et al. |
| 3,557,780 A | 1/1971 | Sato |
| 4,040,548 A * | 8/1977 | Guglielmo ............... A45F 3/08 224/262 |
| 4,236,723 A | 12/1980 | Lemmon |
| 4,290,421 A | 9/1981 | Siegmund |
| 4,335,875 A | 6/1982 | Elkin |
| 4,473,991 A | 10/1984 | La Mura et al. |
| 4,552,130 A | 11/1985 | Kinoshita |
| 4,569,335 A | 2/1986 | Tsuno |
| 4,598,698 A | 7/1986 | Siegmund |
| 4,667,655 A | 5/1987 | Ogiu et al. |
| 4,745,908 A | 5/1988 | Wardle |
| 4,846,153 A | 7/1989 | Berci |
| 4,848,780 A | 7/1989 | Straub |
| 4,860,731 A | 8/1989 | Matsuura |
| 5,062,651 A | 11/1991 | Varieur |

(Continued)

OTHER PUBLICATIONS

Supplement to Anesthesiology News, Buyer's Guide, Dec. 2006, pp. front cover & 3-8.

(Continued)

*Primary Examiner* — Scott McNurlen
(74) *Attorney, Agent, or Firm* — Lewis Brisbois Bisgaard & Smith LLP

(57) ABSTRACT

An apparatus and method for towing a load behind a person is disclosed which reduces or dampens the effect of human movement on the load and vice versa. Further, the apparatus and method reduce or dampen the impact and vibrations resulting from traveling over a surface. In one embodiment, the apparatus and method is comprised of a harness for a person to wear, a carriage, and a bow connecting the harness and the carriage.

9 Claims, 12 Drawing Sheets

(56) References Cited

U.S. PATENT DOCUMENTS

| | | | |
|---|---|---|---|
| 5,106,108 A * | 4/1992 | Howell | B62B 5/068 |
| | | | 280/1.5 |
| 5,183,031 A | 2/1993 | Rossoff | |
| 5,183,279 A | 2/1993 | Acerno et al. | |
| 5,244,217 A | 9/1993 | Kotulla | |
| 5,246,455 A | 9/1993 | Shikani | |
| 5,265,891 A | 11/1993 | Diehl | |
| 5,279,281 A | 1/1994 | Harvey | |
| 5,327,881 A | 7/1994 | Greene | |
| 5,353,807 A | 10/1994 | DeMarco | |
| 5,363,838 A | 11/1994 | George | |
| 5,375,861 A | 12/1994 | Gifford | |
| 5,385,355 A * | 1/1995 | Hoffman | B62D 51/04 |
| | | | 280/1.5 |
| 5,464,008 A | 11/1995 | Kim | |
| D367,142 S | 2/1996 | Platt | |
| 5,601,603 A | 2/1997 | Illi | |
| 5,622,294 A | 4/1997 | Evans | |
| 5,643,221 A | 7/1997 | Bullard | |
| 5,676,635 A | 10/1997 | Levin | |
| 5,685,823 A | 11/1997 | Ito et al. | |
| 5,733,244 A | 3/1998 | Yasui et al. | |
| 5,735,361 A | 4/1998 | Forrest | |
| 5,817,015 A | 10/1998 | Adair | |
| 5,842,444 A | 12/1998 | Perrulli | |
| 5,913,816 A | 6/1999 | Sanders et al. | |
| 5,921,917 A | 7/1999 | Barthel et al. | |
| 5,928,137 A | 7/1999 | Green | |
| 5,941,816 A | 8/1999 | Barthel et al. | |
| 6,006,968 A | 12/1999 | Mccarthy et al. | |
| 6,027,001 A | 2/2000 | Levitan | |
| 6,039,333 A * | 3/2000 | Hamblin | B62B 5/068 |
| | | | 280/1.5 |
| 6,126,592 A | 10/2000 | Proch et al. | |
| 6,131,917 A | 10/2000 | Walsh | |
| 6,139,033 A * | 10/2000 | Western | B62B 1/02 |
| | | | 280/1.5 |
| 6,220,611 B1 | 4/2001 | Shapiro | |
| 6,349,949 B1 | 2/2002 | Gorringe | |
| 6,354,993 B1 | 3/2002 | Kaplan et al. | |
| RE37,772 E | 6/2002 | Kelleher | |
| 6,409,657 B1 | 6/2002 | Kawano | |
| 6,450,377 B1 | 9/2002 | Oriolo | |
| 6,450,948 B1 | 9/2002 | Matsuura et al. | |
| 6,565,507 B2 | 5/2003 | Kamata et al. | |
| 6,569,089 B1 | 5/2003 | Covington et al. | |
| 6,581,945 B1 | 6/2003 | Shapiro | |
| 6,595,915 B2 | 7/2003 | Akiba | |
| 6,652,453 B2 | 11/2003 | Smith et al. | |
| 6,685,198 B1 | 2/2004 | Hartman | |
| 6,699,182 B2 | 3/2004 | Pilvisto | |
| 6,702,738 B2 | 3/2004 | Ito | |
| 6,843,769 B1 | 1/2005 | Gandarias | |
| 6,849,042 B2 | 2/2005 | Christopher | |
| 6,863,297 B2 | 3/2005 | Shapiro | |
| 6,866,626 B2 | 3/2005 | Long et al. | |
| 6,881,188 B2 | 4/2005 | Furuya et al. | |
| 6,929,600 B2 | 8/2005 | Hill | |
| 6,932,761 B2 | 8/2005 | Maeda et al. | |
| 7,007,956 B1 | 3/2006 | Pinon | |
| 7,114,731 B2 | 10/2006 | Malrick | |
| 7,150,713 B2 | 12/2006 | Shener et al. | |
| 7,182,728 B2 | 2/2007 | Cubb et al. | |
| 7,246,802 B2 | 7/2007 | Yeung | |
| 7,311,313 B1 * | 12/2007 | Ray | B62B 5/068 |
| | | | 280/1.5 |
| 7,487,980 B2 | 2/2009 | Goddard et al. | |
| 7,617,956 B1 * | 11/2009 | Sabbah | A45C 5/143 |
| | | | 190/18 A |
| 7,818,951 B1 | 10/2010 | Boutilier | |
| 7,938,409 B2 | 5/2011 | Mejia | |
| 8,062,107 B1 * | 11/2011 | Sauer | A01M 31/006 |
| | | | 452/197 |
| 8,091,899 B2 | 1/2012 | Mejia | |
| 2001/0030402 A1 | 10/2001 | White | |
| 2001/0043000 A1 | 11/2001 | Hinds | |
| 2002/0079607 A1 * | 6/2002 | Hawley | B29B 15/122 |
| | | | 264/136 |
| 2002/0123664 A1 | 9/2002 | Mitsumori | |
| 2003/0067130 A1 | 4/2003 | Gordon | |
| 2003/0111813 A1 | 6/2003 | Assaf et al. | |
| 2004/0016781 A1 | 1/2004 | Smith | |
| 2004/0153057 A1 | 8/2004 | Davison | |
| 2004/0220451 A1 | 11/2004 | Gravenstein et al. | |
| 2005/0279354 A1 | 12/2005 | Deutsch et al. | |
| 2005/0279360 A1 | 12/2005 | Wei | |
| 2006/0047184 A1 | 3/2006 | Banik et al. | |
| 2006/0240960 A1 * | 10/2006 | Shahinpoor | A63B 69/18 |
| | | | 482/121 |
| 2006/0247497 A1 | 11/2006 | Gardner | |
| 2006/0276689 A1 | 12/2006 | Litscher et al. | |
| 2007/0043262 A1 | 2/2007 | Levy et al. | |
| 2007/0074720 A1 | 4/2007 | Schwartz et al. | |
| 2007/0129603 A1 | 6/2007 | Hirsh | |
| 2007/0135682 A1 | 6/2007 | Miyagi et al. | |
| 2007/0187910 A1 | 8/2007 | Adams | |
| 2008/0117032 A1 * | 5/2008 | Dillon | B60Q 1/503 |
| | | | 340/426.1 |
| 2008/0195128 A1 | 8/2008 | Orbay et al. | |
| 2008/0238024 A1 | 10/2008 | Heidenreich et al. | |
| 2008/0296851 A1 * | 12/2008 | Hall | B62B 5/068 |
| | | | 280/1.5 |
| 2009/0051142 A1 * | 2/2009 | Francois | A63C 5/12 |
| | | | 280/608 |
| 2009/0192350 A1 | 7/2009 | Mejia | |
| 2009/0192355 A1 | 7/2009 | Mejia | |
| 2009/0261540 A1 * | 10/2009 | Mejia | B62B 5/068 |
| | | | 280/1.5 |
| 2010/0094090 A1 | 4/2010 | Mejia | |
| 2010/0204628 A1 | 8/2010 | Ghajar | |
| 2012/0126499 A1 * | 5/2012 | Nieman | A45C 13/385 |
| | | | 280/30 |
| 2014/0265167 A1 | 9/2014 | Mejia | |

OTHER PUBLICATIONS

Supplement to Anesthesiology News, Buyer's Guide, Jun. 2007, pp. front cover, 3 & 7 and back cover.
Hagberg, "Current Concepts in the Mangement of the Difficult Airway," Anesthesiology News, May 2007, vol. 33, No. 7, pp. 1-19.
Advertisement "How Does the Best Laryngoscope System in the World Actually Pay for Itself?" Heine, Date unkown.
Advertisement "The Bullard Elite Laryngoscopes," Gyrus ACMI, Date unkown.
Advertisement "The Most Important Two Minutes of Your Day," LMA Ctrach, Date Unknown.
Advertisement "New Ways to Manage the Airway," King Systems Corporation, Date unkown.
Advertisement "Making Difficult Intubation Easy," Teleflex Medical, Date unknown.
Levitan, "Optical Stylet Aids Emergency Intubation," Clinical Anesthesiology, May 2007, p. 43.
Advertisement, "AirTraq Optical Laryngoscope," King Systems Corporation, Date unkown.
Advertisement, "See Clearly Now," Verathon Medical, Date unknown.
Advertisement, "Certainty. Confidence. Combitube," Nellcor, Date unknown.
Advertisement, "Simple Solutions for Complex Problems, Airway management, particularly difficult or failed, is one of the most challenging situations faced by anesthesiologists," Smiths Medical, date unknown.
Advertisement, "McGrath Series 5, The Worlds first fully Portable Video Laryngoscope," LMA, Date unknown.
"Airway Management Products," Clarus Medical available at www.clarus-medical.com/airway-management/airway_products.htm, printed on May 19, 2008.
"Airway Management Products: SOS," Clarus Medical available at www.clarus-medical.com/airway-management/airway_SOS.htm, printed on May 19, 2008.

(56) References Cited

OTHER PUBLICATIONS

"Airway Management Products: Levitan," Clarus Medical available at www.clarus-meedical.com/airway-management/airway_levitan.htm, printed on May 19, 2008.

"Airway Management SOS," Clarus Medical available at www.clarus-medical.com/airway-management/airway_fast.htm, printed on May 19, 2008.

Advertisement, "ClarusScope, Spinal and Cranial Endoscopic System," Clarus Meedical, date unknown.

* cited by examiner

APPARATUS AND METHOD FOR TOWING A LOAD BY A PERSON

FIELD OF THE INVENTION

The present disclosure is related to devices for towing a load behind a person. More specifically, an apparatus and method is contemplated wherein a harness and a load are connected by a bow-shaped coupling device, which reduces or dampens the effect of human motion on the load and the effect of load motion on the human.

CROSS-REFERENCE TO RELATED APPLICATIONS

This application claims priority to U.S. Provisional Patent Application No. 61/888,860, filed Oct. 9, 2013, which is incorporated by reference herein in its entirety.

BACKGROUND OF THE INVENTION

A variety of devices are known for towing a load. Among these devices are sulkies, rickshaws, and towed carriages for attachment to bicycles. Typically, one or more rigid members are applied to connect the load to the person. These members create a direct connection between the person and the load which is necessary to maintain a constant distance between the two. These devices are generally suited for constant linear motion.

However, when a load is directly connected to a person who is in motion, the person's bipedal gait presents a problem. A person's bipedal movement in combination with the rigid structure and direct connection with the load introduces various accelerations in numerous directions, including but not limited to horizontal, vertical and tangential directions. These accelerations result in an unsteady and sometimes jerking motion to the load. In turn, a load can impart various accelerations and a jerking motion on the person.

Further, prior art devices call for a rigid device or system with little impact absorption outside of what may be achieved by tires, suspension systems or seat materials. Severe vibrations from the surface the load is traveling on can create an unstable and potentially unsafe towing of the load. Likewise, the various forces applied to the load through the ground or other surface on which the load travels are translated to the person. This results in an uncomfortable and potentially unsafe experience for the person. These and other problems exist in the prior art and remain unsolved.

SUMMARY OF THE INVENTION

Thus, in light of the shortcomings of the prior art, there is a need to provide an apparatus and method which addresses these and other problems associated with prior art devices, and that otherwise provides a person with the ability to tow a load of varying weight while he or she is in motion, such as during walking, running, cycling, skating, skiing, or any other activity. There is further the need to provide a harness that is adjustable such that the harness is both comfortable to the person and allows a wide range of motion during travel and accommodates the towing of a load. There is even a further need to provide an improved connection between the person and the load, which reduces the impact of human motion on the load and vice versa, and provides for the stability of the load and the overall comfort of the person.

One aspect of the present disclosure is to provide an apparatus and method which allows a person to have complete range of motion while the person is towing a load. A harness may be attached to the person, and a novel bridging or coupling device (referred to hereinafter as a "bow") may be further attached to the harness. In turn, the distal end of the bow may be further attached to a carriage or similar apparatus for towing by the person. The fit of the harness, the connection between the harness and the bow, the distance between the person and the load, and other features of the present disclosure allow the person the freedom to move while walking, jogging, running, cycling, skiing, skating, or other engaging in any other form of activity.

It is a further aspect of the present disclosure is to provide an apparatus and method for towing a load that is a comfortable and safe experience for the person. The apparatus and method may contain a bow which is designed to reduce the various accelerations and jerking motion that the load imparts on the person. Further, the bow may reduce impacts and vibrations resulting from load and person traveling across a surface. The following are incorporated by reference herein in their entireties: U.S. Pat. No. 5,062,651 entitled "Jogging Baby Carriage"; U.S. Pat. No. 2,343,019 entitled "Tractor-Trailer Combination"; U.S. Pat. No. 660,598 entitled "Bicycle-Tender"; and U.S. Pat. No. 5,106,108 entitled "Child's Sulky and Attachment to a Human."

Another aspect of the present disclosure is to provide an apparatus and method for creating a stable and safe experience from the perspective of the load, which in certain embodiments may be a child. The apparatus and method may comprise a bow as described herein, which is designed to reduce the various accelerations and jerking motions that result from the bipedal movement or any other type of human movement that results from the person. Further, the bow may aid in reducing impacts and vibrations that result from the person and the load traveling across a surface. The following are incorporated by reference herein in their entireties: U.S. Pat. No. 7,007,956 entitled "Harness Device, Kit and Method of Using Same"; U.S. Des. Pat. No. 367,142 entitled "Body Harness for Towing"; and U.S. Pat. No. 4,335,875 entitled "Jogging Rope Harness."

A further aspect of the present disclosure is to provide an apparatus and method which includes a carriage as the load towed behind a person. The carriage would allow the person to tow a load such as a child, a pet or various supplies while participating in a variety of exercise or general travel activities, thus allowing the person to engage in activities that would otherwise be impractical, as well as conferring the benefits of outdoor exposure and stimulation upon the person and his or her passenger.

Another aspect of the present invention is to provide an assembly for towing a load by a user, comprising: a carriage for receiving a load for towing; a coupling device substantially conforming to the shape of a bow and having sufficient length to prevent the user from contacting the carriage while in motion; a harness for use by the user that comprises at least one belt and at least one attachment mechanism on a portion of the at least one belt for securing the at least one belt around the waist of the user; a first connecting mechanism for connecting a first distal end of the coupling device to the harness; and a second connecting mechanism for connecting a second distal end opposite the first distal end of the coupling device to the carriage.

It will be appreciated by those skilled in the art that the concepts presented herein are applicable for use with a variety of other conveyances other than the apparatus and method listed above and/or described in the detailed description below, such as sleds, rickshaws, pedicabs, bicycle taxis, wagons, buggies and trailers, to name a few. Furthermore, the apparatus and method as disclosed may include a number of embodiments wherein the person is not necessarily engaged in bipedal movement. For example, the person may be engaged in activities such as skating, cycling or skiing, including cross-country skiing, or any other type of non-bipedal human movement.

Although the drawing figures depict the load as a carriage with wheels, it is to be expressly understood that alternative loads with runners, like the type associated with a sleigh, would operate with and is contemplated with the present disclosure. It is therefore to be understood that the present disclosure includes a variety of different versions or embodiments, and this Summary of the Invention is not meant to be limiting or all-inclusive. That is, this Summary of the Invention provides general descriptions of certain embodiments, but may also include more specific descriptions of certain other embodiments.

One having skill in the art will appreciate that embodiments of the present disclosure may be constructed of materials known to provide, or predictably manufactured to provide the various aspects of the present disclosure. These materials may include, for example, stainless steel, titanium alloy, aluminum alloy, chromium alloy, and other metals or metal alloys. These materials may also include, for example, fiberglass, fiberglass laminate, wood, wood laminate, metal, metal laminate, Kevlar, carbon fiber, foam core, torsion box, cap ski, plastic, composite, carbon fiber, ABS plastic, polyurethane, polyethylene, photo-polymers, resins, particularly fiber-encased resinous materials, rubber, latex, synthetic rubber, synthetic materials, polymers, and natural materials.

The use of the terms load, bow, and/or harness, together or in conjunction with one another, is not intended to be limiting in any respect, and it is to be expressly understood that use of an equivalent apparatus or method, alone or in conjunction with another apparatus or method, consistent with the scope of the appended claims, is considered to be within the scope of the present disclosure. In addition, the term towing assembly as used below is used to make easy reference to the apparatus in its entirely, and the term is not meant to limit the scope of the invention in any way.

The Summary of the Invention is neither intended nor should it be construed as being representative of the full extent and scope of the present disclosure. The present disclosure is set forth in various levels of detail in the Summary of the Invention as well as in the attached drawings and the Detailed Description of the Invention and no limitation as to the scope of the present disclosure is intended by either the inclusion or non-inclusion of elements, components, etc. in this Summary of the Invention. Additional aspects of the present disclosure will become more readily apparent from the Detailed Description, particularly when taken together with the drawings.

The above-described benefits, embodiments, and/or characterizations are not necessarily complete or exhaustive, and in particular, as to the patentable subject matter disclosed herein. Other benefits, embodiments, and/or characterizations of the present disclosure are possible utilizing, alone or in combination, as set forth above and/or described in the accompanying figures and/or in the description herein below. However, the claims set forth herein below define the invention.

BRIEF DESCRIPTION OF THE DRAWINGS

The accompanying drawings, which are incorporated in and constitute a part of the specification, illustrate embodiments of the disclosure and together with the general description of the disclosure given above and the detailed description of the drawings given below, serve to explain the principles of the disclosures.

It should be understood that the drawings are not necessarily to scale. In certain instances, details that are not necessary for an understanding of the disclosure or that render other details difficult to perceive may have been omitted. It should be understood, of course, that the disclosure is not necessarily limited to the particular embodiments illustrated herein.

In the drawings:

FIG. 1 is a side perspective view of an apparatus for towing a load by a person, according to one embodiment of the present disclosure;

FIG. 2 is a rear view of the apparatus shown in FIG. 1;

FIG. 3 is a side view of the apparatus shown in FIG. 1;

FIG. 4 is a top view of the apparatus shown in FIG. 1;

Figure 1:
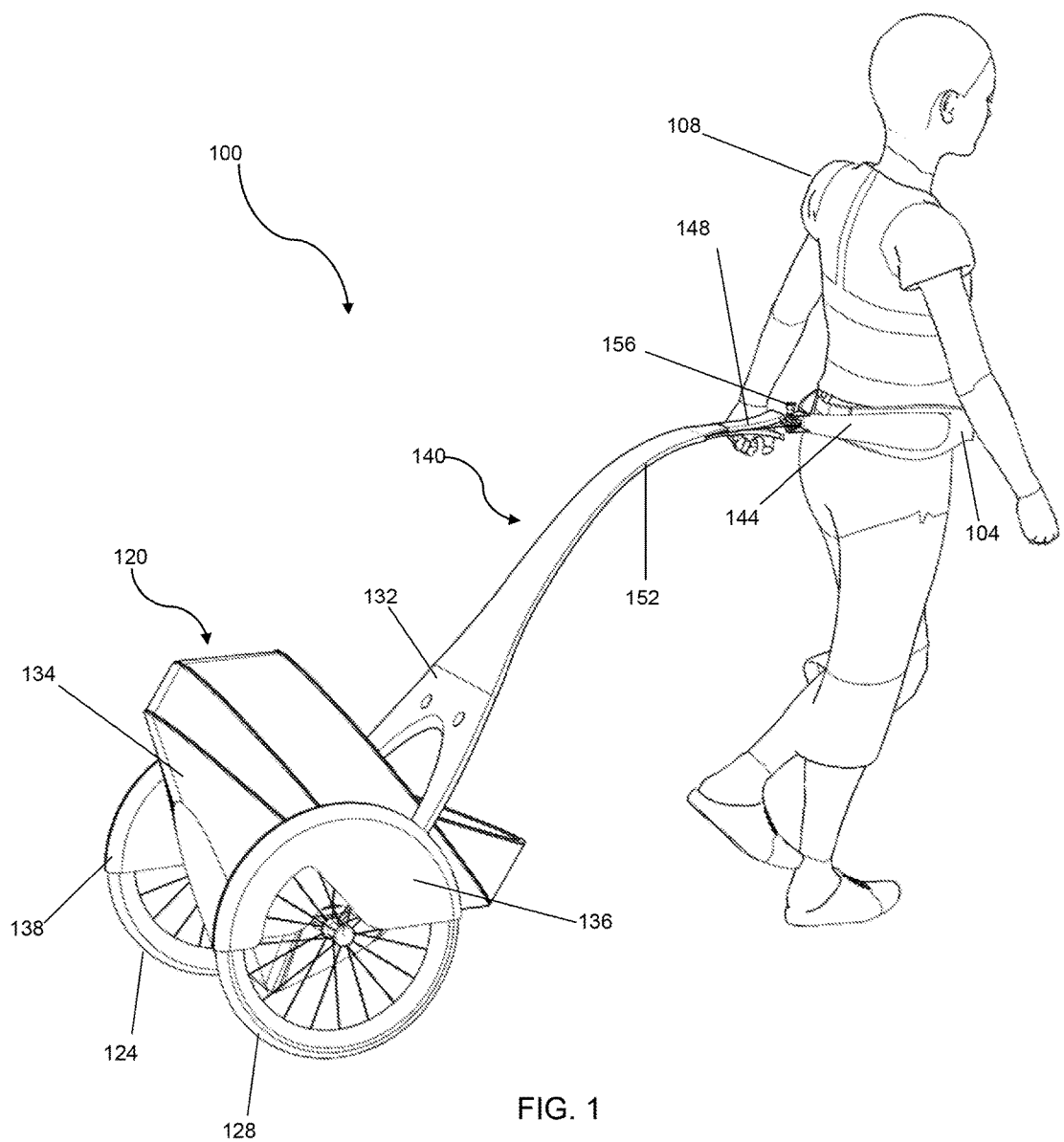
Figure 2:
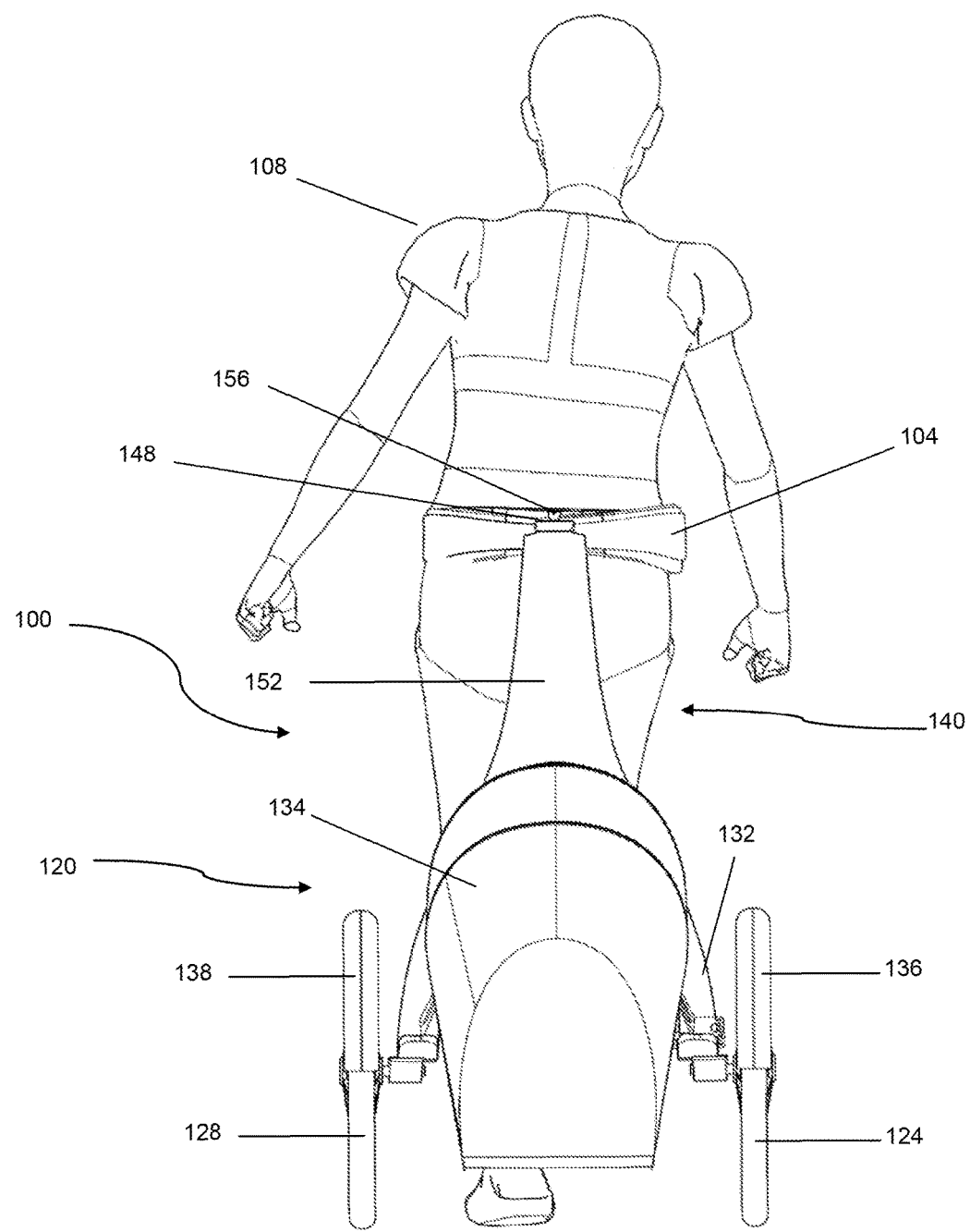
Figure 6A:
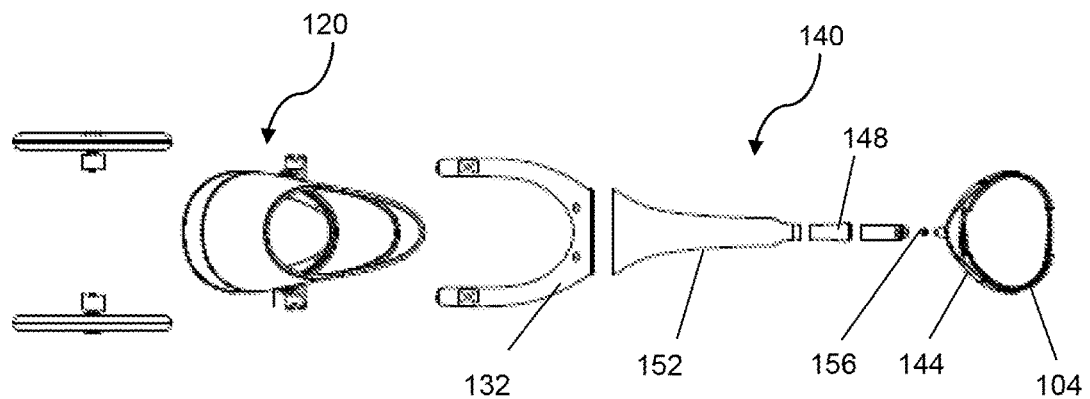
Figure 6B:
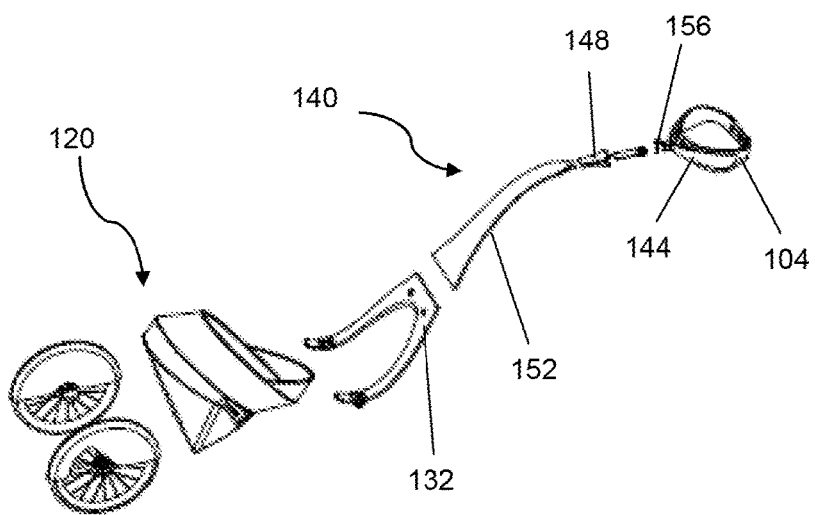
Figure 7A:
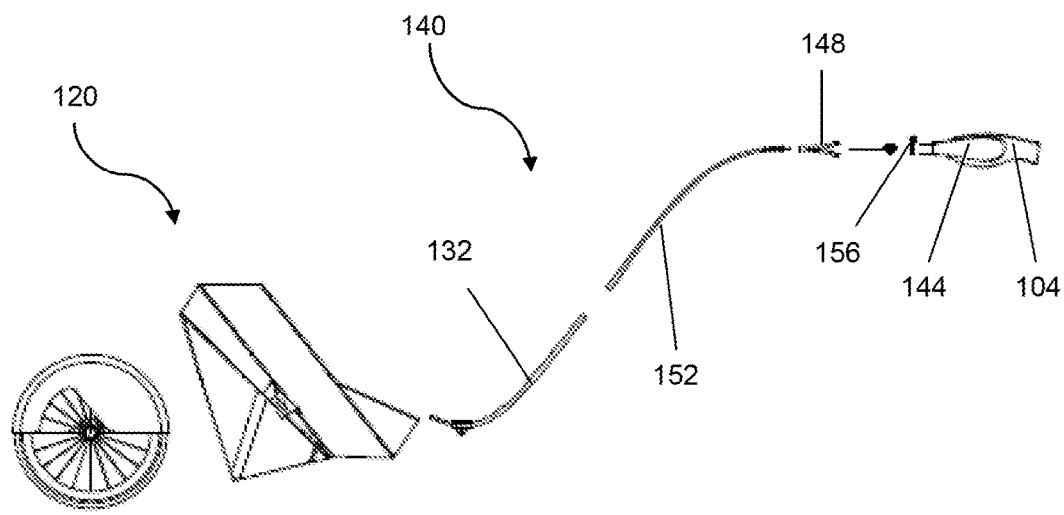
Figure 7B:
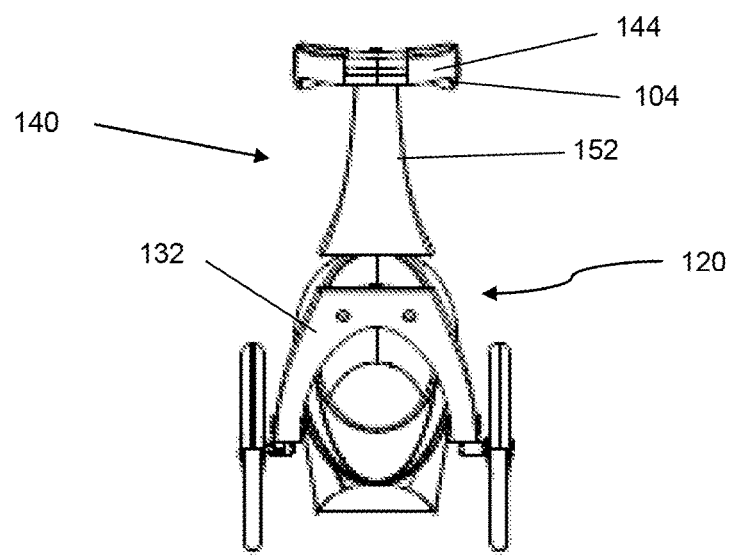
Figure 8A:
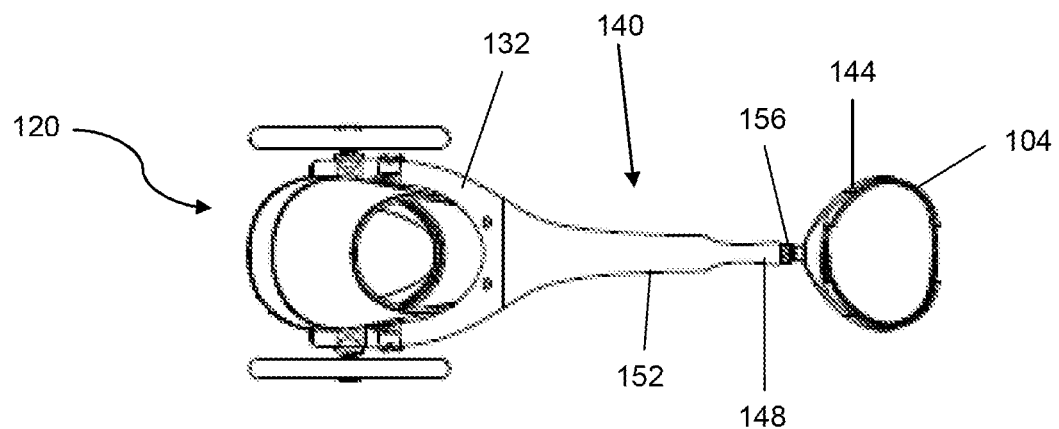
Figure 8B:
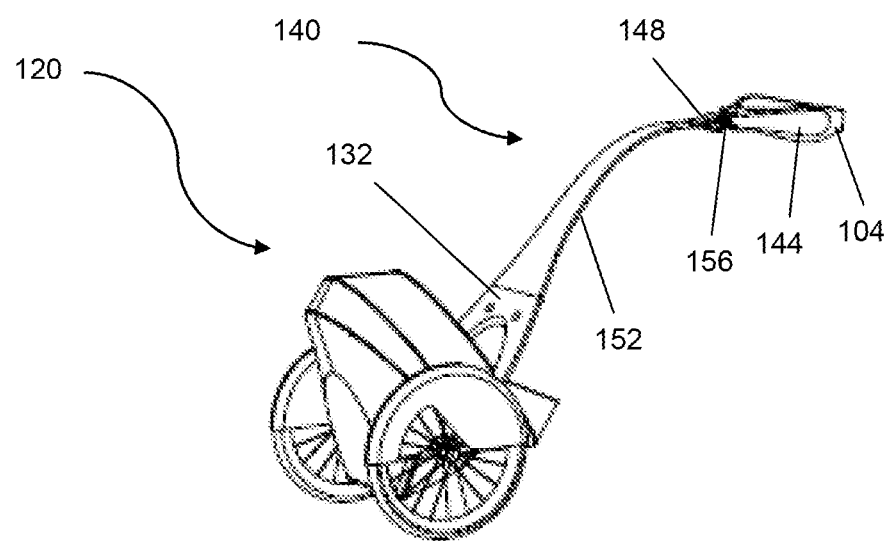
Figure 8C:
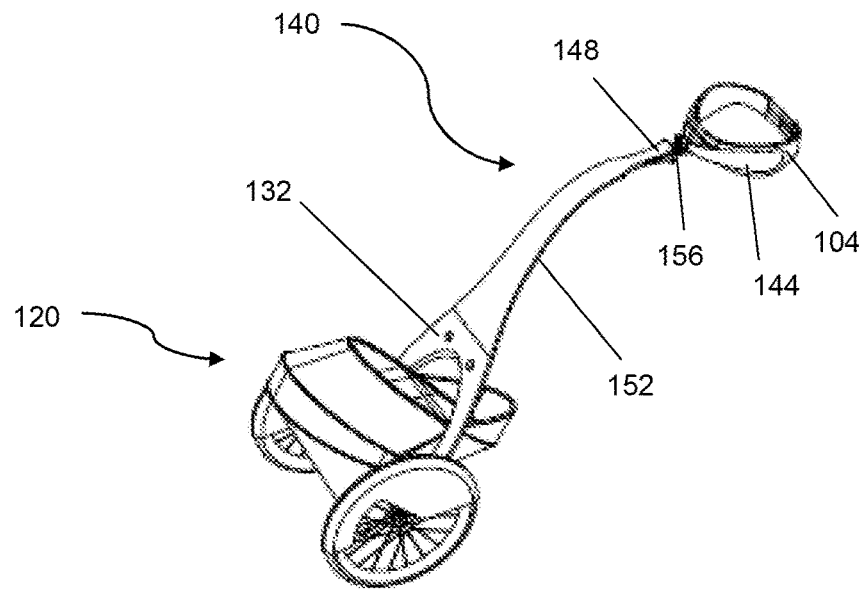
Figure 8D:
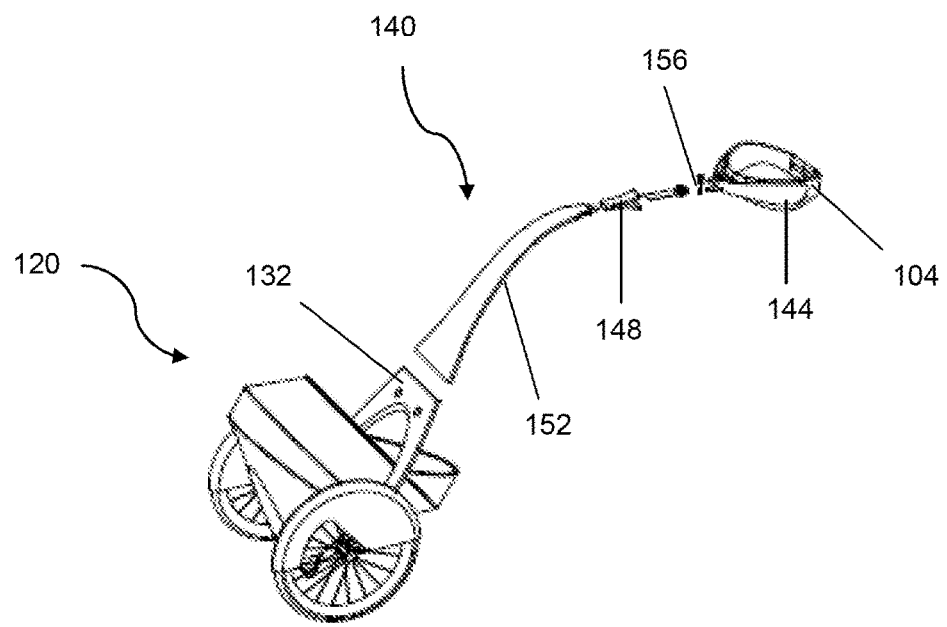

FIGS. 5A-D are additional views of the apparatus shown in FIG. 1;

FIGS. 6A-B are partially exploded views of the apparatus shown in FIG. 1;

FIGS. 7A-B are additional partially exploded views of the apparatus shown in FIG. 1;

FIGS. 8A-D are further additional views of the apparatus shown in FIG. 1; and

Figure 9A:
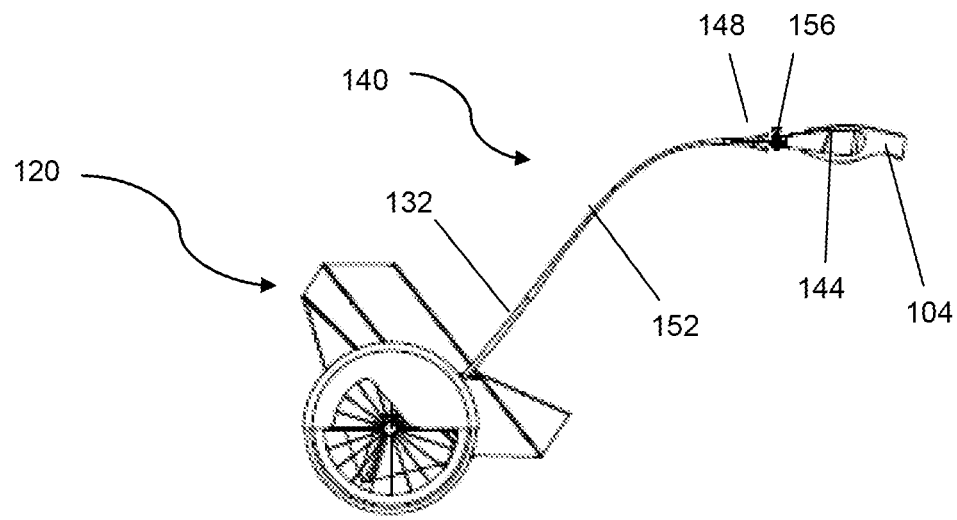
Figure 9B:
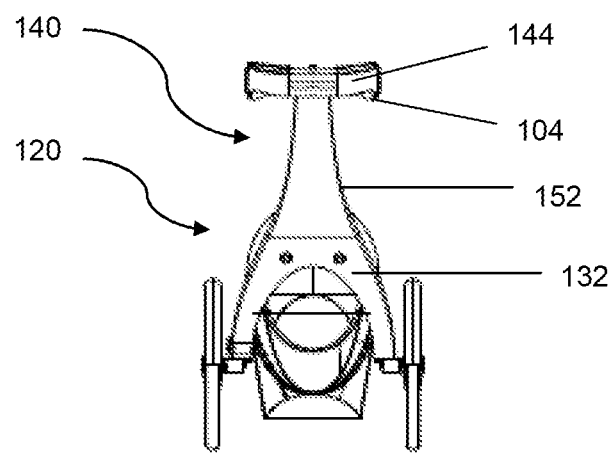
Figure 9C:
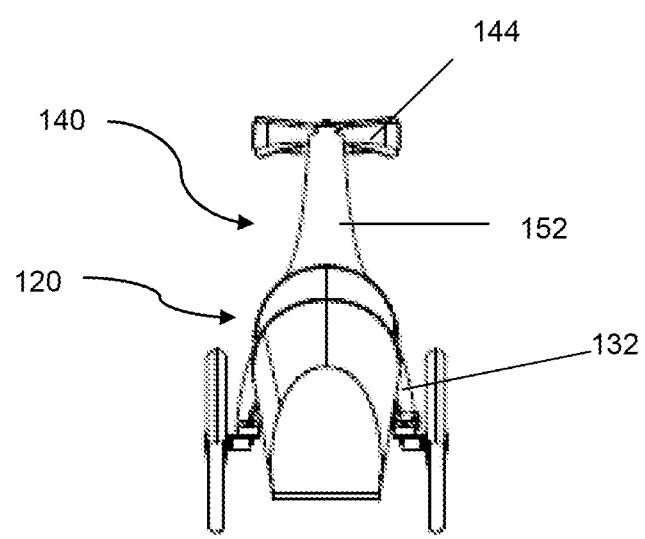

FIGS. 9A-C are yet further additional views of the apparatus shown in FIG. 1.

DETAILED DESCRIPTION

As shown in the appended Figures and described in further detail herein, the present disclosure relates to a novel apparatus and method for towing a load behind a person. More specifically, the present disclosure includes embodiments comprising a harness and a load, which are preferably connected by a bow-shaped coupling device, which serve to reduce or dampen the effect of human motion on the load and the effect of load motion on the user.

Varying views of the present disclosure are depicted in drawing FIGS. 1-9. With reference to the figures, the present disclosure is directed to apparatuses, components, and methods generally related to a towing assembly 100, including various embodiments, subcombinations, and subsets thereof.

To further assist in the understanding of one embodiment of the present disclosure, the following list of components and associated numbering found in the drawings is provided herein:

| Number | Component |
|---|---|
| 100 | Towing Assembly |
| 104 | Harness |
| 108 | Person |
| 120 | Carriage |
| 124 | First Wheel |
| 128 | Second Wheel |
| 132 | Chassis |
| 134 | Seat |
| 136 | First Fender |
| 138 | Second Fender |
| 140 | Bow |
| 144 | Connector |
| 148 | First Member |
| 152 | Second Member |
| 156 | Dampening Element |

A preferred embodiment of the present disclosure is depicted in FIG. 1. According to this particular embodiment, the assembled apparatus comprises a carriage 120, a harness 104 for securing the carriage 120 to a person 108, and a bridging/coupling device or "bow" 140 between the carriage 120 and the harness 104 for towing the carriage 120 behind the person 108. In use, the carriage 120 may be towed by the person 108 by means of wearing the harness 104, such as during walking, jogging, cycling, skiing, skating, or other activity.

According to various embodiments disclosed herein, the bow 140 between the harness 104 and the carriage 120 comprises at least a first member 148 and a second member 152, which extend a specified length between the carriage 120 and the person 108 as necessary for the desired activity. In one embodiment, the length is adjustable to a certain degree to permit adjustment of the bow 140 to accommodate taller or shorter users or to accommodate varying activities, such as would be necessary to adjust between a user walking and a user skiing while attached to the bow 140 and carriage 120. In yet another embodiment, at least one of the first member 148 and second member 152 are available in different lengths and may be substituted during differing activities as desired by the user.

Referring to FIG. 1 in greater detail, the towing assembly 100 preferably comprises: a harness 104, which may be fitted around the waist of a person 108; a carriage 120, which may comprise at least a first and second wheel; a bow 140 that connects the harness 104 to the carriage 120. The bow 140 is preferably comprised of a rigid or semi-rigid material, such that the carriage 120 maintains a distance behind the person 108, but which is also flexible enough to reduce the effect of human motion on the carriage 120 and vice versa.

Figure 4:
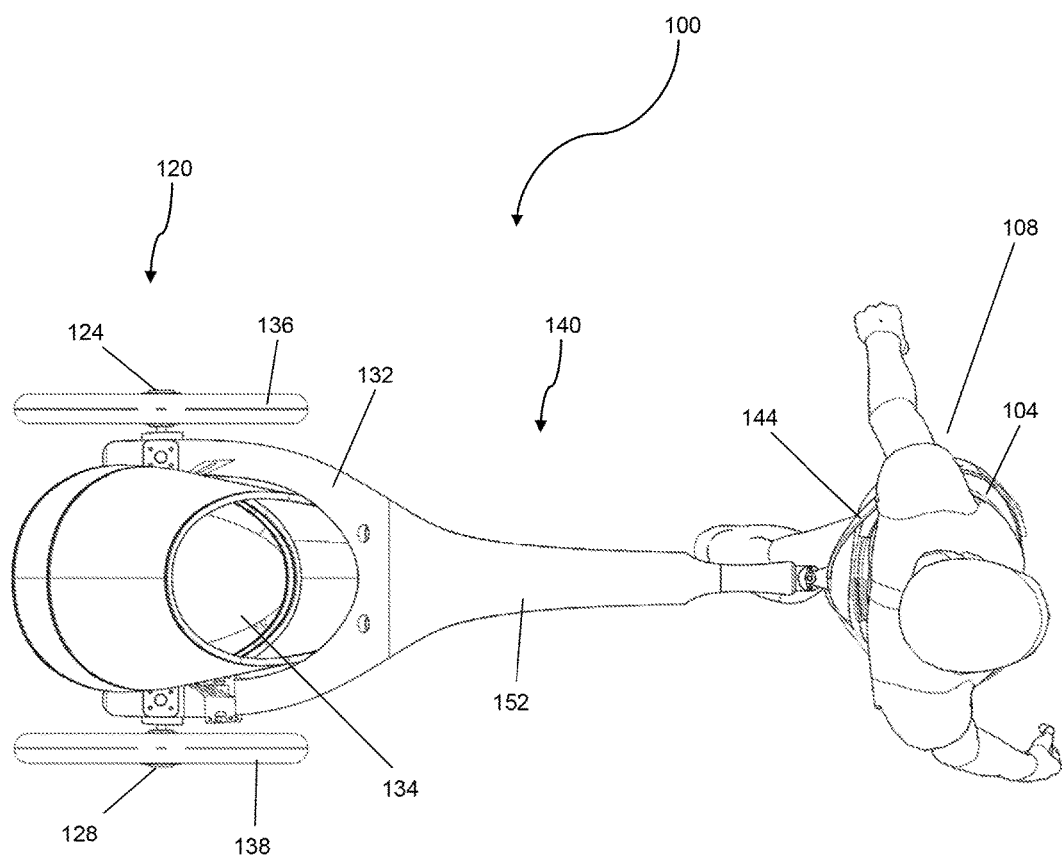
Figure 5A:
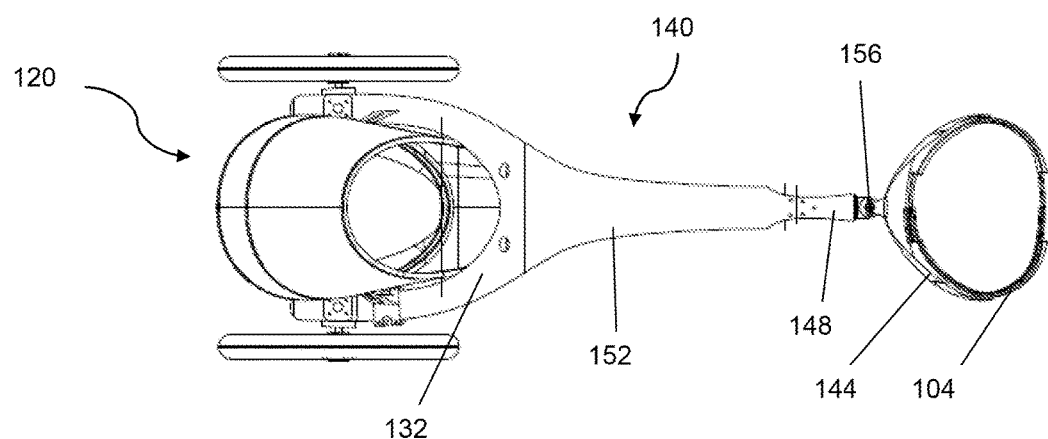
Figure 5B:
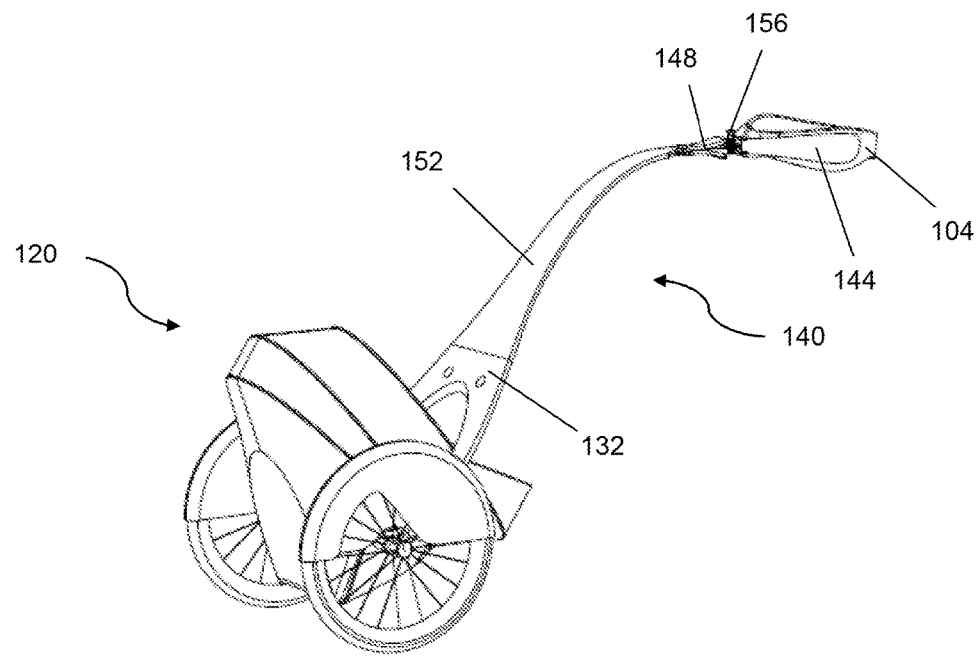
Figure 5C:
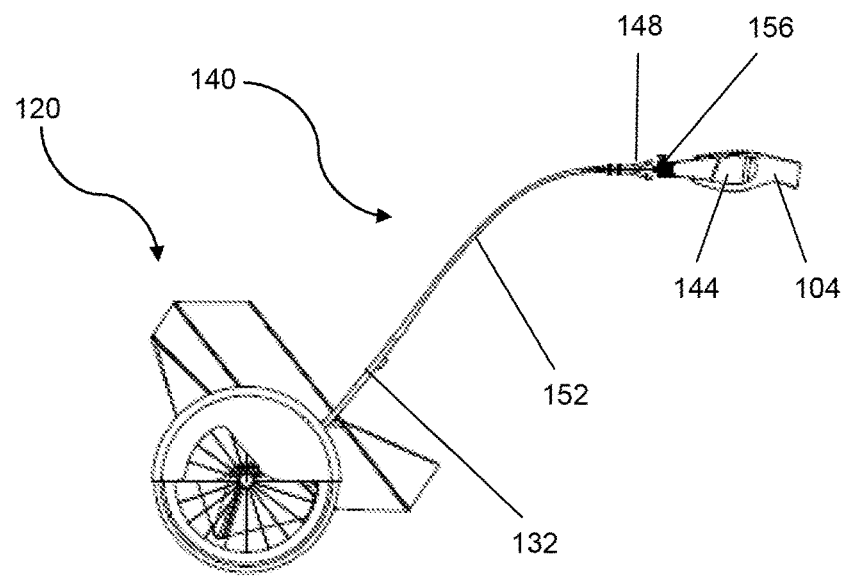
Figure 5D:
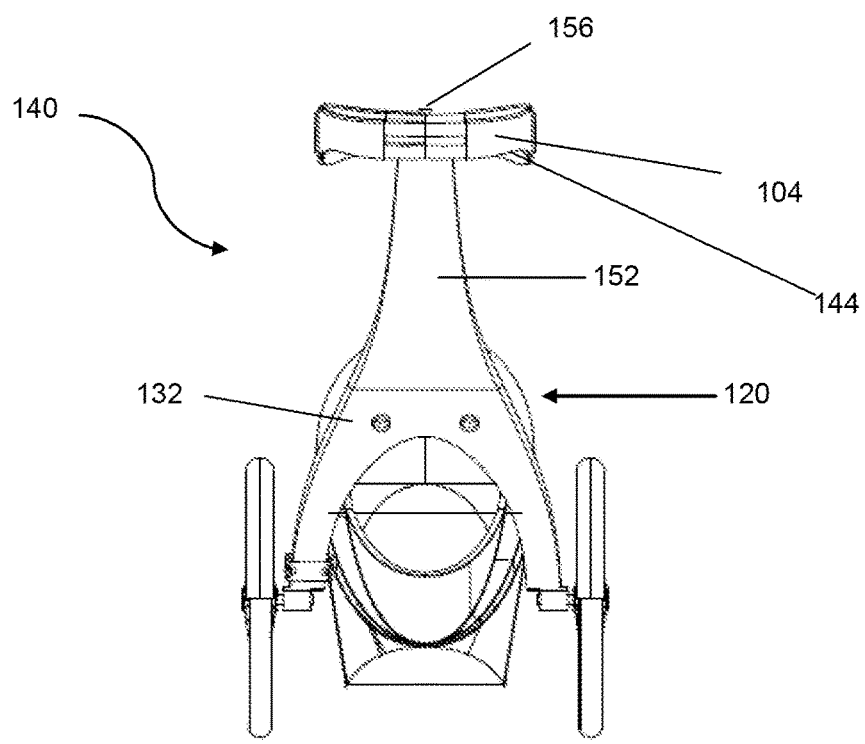

In this particular embodiment of the towing assembly 100, the harness 104 comprises a generally wishbone-shaped connector 144 that bridges between the bow 140 and the person 108, as best shown in FIG. 4. This connector preferably connects to the harness 104 at two points, on the left side and right side of the person 108. Further, the bow 140 preferably connects to the carriage 120 at a single point. In alternative embodiments, the number of connections—and the type of connections—between the harness 104 and the bow 140 and the bow 140 and the carriage 120 may vary.

In the embodiment depicted in FIGS. 1-4, the bow 140 provides sufficient rigidity to maintain the load 120 at a distance behind the person so as not to interfere with the regular motion of the person 108 towing the carriage 120. Further, the bow 140 provides sufficient resistance against torsional and shearing forces that are incident to the various accelerations imparted on the bow 140 from either the carriage 120 or the person 108.

In the embodiments depicted in FIGS. 1-4, the bow 140 comprises a first member 148 and a second member 152. The first member 148 primarily provides the sufficient rigidity and resistance as described above. The second member 152 is a made from a continuous piece of material extending from the first member 148 to the connection point with the carriage 120. The first member 148 is preferably not a continuous piece of material, and may contain a discrete, adjustable dampening element 156.

Figure 3:
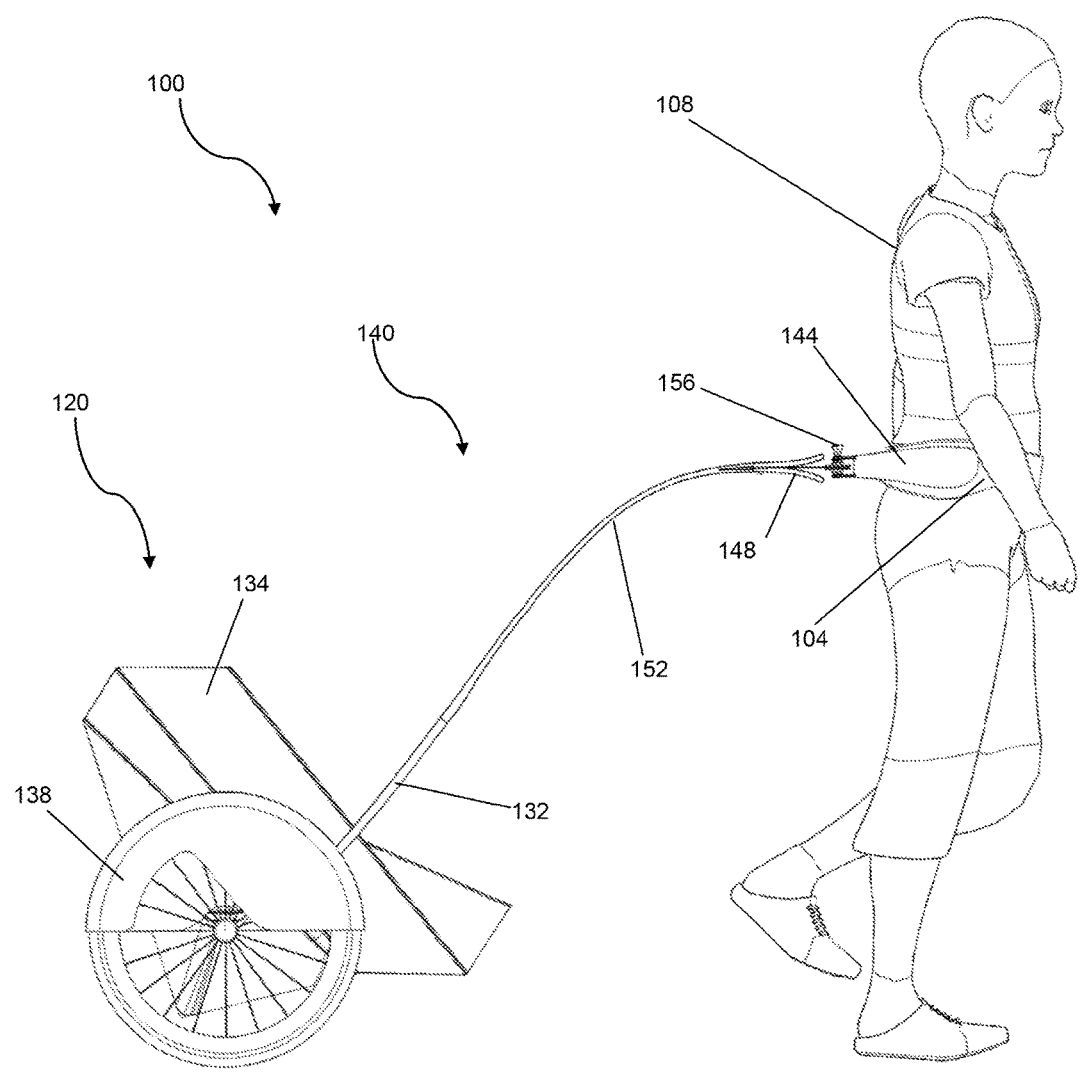

Referring in detail to FIG. 3, the dampening element 156 is preferably connected to a distal portion of first member 148. The dampening element 156 is also preferably connected with the wishbone-shaped connector 144 as shown in FIG. 3. In one embodiment, the dampening element 156 may be used to dampen forces in multiple planes, and may further permit freedom or rotation between the first member 148 and the connector 144. For example, dampening element 156 may serve as a pivot or hinge element relative to the first member 148 and/or the connector 144. In one particular embodiment, the first connector is shaped substantially to resemble a duckbill, and comprising a distal portion extending therefrom for attachment to the dampening element 156.

To a lesser extent than the first member 148, the second member 152 may also contribute to providing sufficient dampening as well as rigidity and resistance as described above. The second member 152 may be comprised of materials to provide the rigidity desired while still permitting a degree of dampening, including materials such as fiberglass, fiberglass laminate, wood, wood laminate, metal, metal laminate, Kevlar, carbon fiber, foam core, torsion box, cap ski, plastic, composite, carbon fiber, ABS plastic, polyurethane, polyethylene, photo-polymers, resins, particularly fiber-encased resinous materials, by way of example.

Further in this embodiment, the bow 140 provides sufficient flexibility to reduce the various accelerations and jerking motion that the person 108 imparts on the load 120 and vice versa. Further, the bow 140 provides sufficient flexibility to reduce impacts and vibrations resulting from the person 108 and load 120 traveling across a surface. As mentioned above, the bow 140 is this embodiment contains a first member 148 and a second member 152. The second 152 member primarily provides flexibility for the above-desired effects. To this end, the second member 152 may also comprise a discrete, adjustable dampener which reduces the various accelerations and jerking motions that the person 108 imparts on the load 120. The first member 148 also aids in providing sufficient flexibility to aid in the reduction of effects discussed in this paragraph since the first member 148 may be composed of a material that flexes while the towing assembly 100 is in use.

The dampening element 156 may be comprised from a variety of materials, components, or combinations thereof. The dampening element 156 may be a discrete component such as a spring, piston, or other movement reducing component. In some embodiments the dampening element 156 may be adjustable. A person 108 may adjust the dampening element 156 for different activities. For example, a person 108 may adjust the dampening element 156 for more intensive activities like running.

The bow 140 may be comprised from a variety of materials that provide both sufficient rigidity and sufficient flexibility. These materials may be used individually or in combination to provide the necessary rigidity and flexibility.

In the embodiment shown in FIGS. 1-4, the bow 140 has a curved shape. This curvature helps the bow 140 flex naturally as the person 108 moves. In other embodiments, the shape of the bow 140 may not be continuous, or the bow 140 may be another shape altogether, but nonetheless help provide a flexing function while the towing assembly 100 is in use.

FIG. 3 shows a side view of the towing assembly 100. This view illustrates the distance between the person 108 and the carriage 120 in this particular embodiment. The rigidity function of the bow 140 allows the carriage 120 to stay behind the person 108 such that the person 108 is free to use his or her complete range of motion when running, jogging, or engaging in other forms of physical activity or movement.

FIG. 4 shows a top view of the towing assembly 100. This view best illustrates the wishbone-shaped connector 144 comprising two connection points between the bow 140 and the harness 104. The two connection points are preferably positioned equidistance from the longitudinal axis of the bow 140 and the left and right side of the person 108. This preferred positioning allows the person 108 to pitch forward and backward without imparting human movement onto the carriage 120.

While the embodiment in FIGS. 1-4 has a particular combination of components, the present invention is not limited by this embodiment. For example, other embodiments of the present disclosure may have fewer or greater members than two. In one embodiment, the member 148 is the only member, without members 152 and 156. In a further embodiment, the second member 152 may not contain a dampener 156 and may be made from a material such as rubber, foam, elastomeric, or other movement reducing material. Alternative embodiments may have the second member 152 comprised from a continuous material like the first member 148. Further yet, either the first member 148 or the second member 152 may contain a dampener 156. In a similar vein, the harness 104 may attach to the person 108 at a different location than the person's 108 waist. Those of skill in the art may find it advantageous to attach the harness 104 to another location, such as a person's 108 upper torso.

Referring now to FIGS. 4 and 5A-D, the carriage 120 preferably comprises a first wheel 124, a second wheel 128, a chassis 132 that connects the first wheel 124 and second wheel 128 to the bow 140. Further, the carriage 120 has a seat 134 that is located on top of the chassis 132. In addition, a first fender 136 is located over the first wheel 124, and a second fender 138 is located over the second wheel 128. It is to be understood that a carriage 120 may be comprised in a number of ways. For example, the load could be multiple loads such as multiple carriages 120, or the carriage 120 may be a sled for supplies, or have a different number of wheels, etc. In another example, the carriage may be wide enough to accommodate more than one child.

FIGS. 6A-B show a partially exploded view of the towing assembly 100. The chassis 132 is preferably positioned between the first wheel 124 and the second wheel 128 in this particular embodiment. This allows the carriage 120 to sit closer to the underlying surface, and lowers the center of gravity of the towing assembly 100, improving the safety and comfort of the person 108 and any passengers.

FIGS. 7A-B show a front perspective view and another partially exploded view of the towing assembly 100. In this view, the combination of first and second members 148, 152 with dampening element 156 and connector 144 may be better viewed independently of one another. The configuration of first and second members 148, 152 further accommodates a person 108 of varying height, as the carriage may be pulled behind a person 108 regardless of the relative height of harness 104.

FIGS. 8A-D and 9A-C show additional views of the towing assembly and are provided to further illustrate the various components of the towing assembly, both in a connected and exploded view. It is expressly understood that these Figures are not necessarily to scale.

The bow described and depicted herein may be provided in a variety of different sizes and shapes without departing from the spirit of the present disclosure. For example, the bow may be substantially arcuate in shape along one or more profiles/surfaces. In one embodiment, the arc shape of the bow has a continuous radius. According to another embodiment, the arc has a constant radius. In yet another embodiment, the bow may comprise a double arc, wherein a first arc is provided in a first orientation and a second arc is provided in a second orientation. This double arc embodiment provides further resistance to forces acting upon the carriage due to the motion of the person towing the carriage or other load. Various combinations and sub-combinations of these differing embodiments is contemplated for use with the present towing assembly disclosure.

With the purpose of holding the carriage up when a person 108 is not present, there may further be provided a retractable brake or kickstand constructed within or attached to the chassis of the carriage 120. Additional means for locking the wheels 124, 128 or otherwise maintaining the carriage 120 in an unmovable or locked position have been contemplated for use with the present disclosure, which would be within the level of ordinary skill in the art to which this disclosure pertains.

With the purpose of ease in breaking down and packaging or transporting the towing assembly 100, the bow 140 may be easily detached from either the harness 104 and/or carriage 120. In addition, wheels 124 and 128 may be quickly released and detached from carriage 120. Accordingly, the assembly 100 may be easily transported in via an automobile trunk, hatch or associated cargo device.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. It is to be understood that certain aspects of the disclosure have utility apart from the combination with other aspects, or as an entire assembly. Thus, the following claims are hereby incorporated into this Detailed Description.

It should be noted that one of the ordinary skill in the art would recognize the intended person 108 for this disclosure to include but not be limited to runners, walkers, rollerbladers, and other pedestrians who wish to incorporate a child into their activity. It should also be noted that the apparatus disclosed herein could be easily modified to couple to a person 108 who is positioned on a bicycle, or alternatively coupled to the bicycle itself, without departing from the novel aspects disclosed herein. Furthermore, it is to be expressly understood that devices other than a carriage 120 may be employed without departing from the novel aspects of the present disclosure for transporting objects other than a child, such as devices for carrying pets, supplies, groceries, weights (for improving performance or training purposes), or other objects desired by the runner, cyclist, walker or other sports enthusiast.

Those of skill in the art will understand how to make and use the present invention after understanding the present disclosure, including the variety of materials that would achieve the desired results. The present invention, in various embodiments, includes providing devices in the absence of items not depicted and/or described herein or in various embodiments hereof, including in the absence of such items as may have been used in previous devices or processes, e.g., for improving performance, achieving ease and\or reducing cost of implementation.

While various embodiments of the present invention have been described in detail, it is apparent that modifications and adaptations of those embodiments will occur to those skilled in the art. However, it is to be expressly understood that such modifications and adaptations are within the spirit and scope of the present invention, as set forth in the following claims.

Moreover, though the present disclosure has included description of one or more embodiments and certain variations and modifications, other variations and modifications are within the scope of the disclosure, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An assembly for towing a load by a user, comprising:
a conveyance for receiving a load for towing, comprising a chassis;
a coupling device having a proximal portion and a distal portion and a longitudinal length therebetween, the coupling device having an arcuate profile over at least a portion of its length and having sufficient longitudinal length to prevent the conveyance from contacting the user while in motion, comprising a material having sufficient rigidity to maintain the length of the coupling device and sufficient flexibility to at least partially dampen the effect of the motion of the user on the conveyance and vice versa and at least partially dampen impacts and vibrations imparted by a surface over which the user and the conveyance travel, wherein the arcuate profile of the coupling device is configured to aid the coupling device in flexing when the conveyance is in motion;
a harness for use by the user that comprises at least one belt, and at least one attachment mechanism on a portion of the at least one belt for adjusting and securing the at least one belt around the waist of the user;
a first connecting mechanism for connecting the proximal portion of the coupling device to the harness;
a second connecting mechanism for connecting the distal portion of the coupling device to the conveyance;
a first dampening element, comprising at least one of a spring and a piston, in conjunction with the second connecting mechanism, adapted to dampen forces along multiple axes;
a second dampening element, in conjunction with the first connecting mechanism;
wherein the conveyance further comprises a first wheel and a second wheel;
wherein the coupling device further comprises first and second members, the first and second members extending a specified length between the conveyance and the user as necessary for a desired activity, wherein the specified length is adjustable to accommodate a height of the user and the desired activity;
wherein the first connecting mechanism comprises a central portion, an upper portion and a lower portion, the central portion extending horizontally, the upper portion curves upwardly and continuously away from the central portion and the lower portion curves downwardly and continuously away from the central portion, the upper and lower portions terminating in unattached, free ends;
wherein the second dampening element comprises at least one of a spring and a piston, is connected to the central portion of the first connecting mechanism;
the first member of the coupling device is made from a single continuous piece of material and comprises an at least semi-flexible material to reduce acceleration and jerking motion; and
the second member of the coupling device is made from a single continuous piece of material extending from the first member of the coupling device to the carriage, and wherein the material of the second member is selected from the group consisting of a rubber, a foam, an elastomeric material, fiberglass, fiberglass laminate, wood, wood laminate, metal, metal laminate, Kevlar, carbon fiber, foam core, torsion box, cap ski, plastic, composite, ABS plastic, polyurethane, polyethylene, photopolymers, resins, and combinations thereof.

2. The assembly according to claim 1 wherein the first connecting mechanism comprises a distal portion configured to receive the second dampening element.

3. The assembly according to claim 1 wherein the first connecting mechanism is configured to permit the harness to pivot relative to the coupling device.

4. The assembly according to claim 1 wherein a lowest point of the chassis is no greater than 4 inches above the ground.

5. The towing assembly of claim 1, wherein the second connecting mechanism integrates the first dampening element.

6. The assembly of claim 1, wherein the arcuate profile of the coupling device has at least one of a continuous radius and a constant radius.

7. The assembly of claim 1, wherein the conveyance is a carriage the chassis connecting the first and second wheels to the second connecting mechanism, and a seat disposed over the chassis.

8. The assembly of claim 7, further comprising a wheel locking mechanism in conjunction with at least one of the first and second wheels.

9. The assembly of claim 8, wherein the wheel locking mechanism comprises at least one of a retractable brake and a kickstand.

* * * * *